United States Patent Office 3,318,775
Patented May 9, 1967

3,318,775
PRODUCTION OF VIRAL ANTIGENS WITH
N-ACETYL-ETHYLENEIMINE
Philip Alexander Melvin and Jean-Michel Gustave Pryce,
Macclesfield, England, assignors to Imperial Chemical
Industries Limited, London, England, a corporation of
Great Britain
No Drawing. Filed Jan. 29, 1963, Ser. No. 254,564
Claims priority, application Great Britain, Feb. 6, 1956,
3,596/56, 3,597/56
3 Claims. (Cl. 167—78)

The present application is a continuation-in-part of application Ser. No. 774,168, filed Nov. 17, 1958, now abandoned, which is in turn a continuation-in-part of Ser. Nos. 635,099 and 635,100, both filed Jan. 22, 1957, and now abandoned.

This invention relates to the production of antigens and more particularly it relates to the production of biological products such as vaccines, toxoids and diagnostic antigens and other biological products containing antigens.

It is known to prepare biological products containing antigens for example immunising agents such as vaccines containing antigens by treating infectious micro-organisms for example infectious viruses with particular inactivating agents for example phenol, formaldehyde, hydrogen peroxide, β-propiolactone, or by subjecting them to the action of heat or to the action of ultra-violet light thereby destroying the infectious properties of the micro-organisms while retaining their antigenic properties. These inactivating agents suffer from several disadvantages in that they are sometimes too destructive towards the antigenic structures of micro-organisms for example viruses and it is often difficult to ensure complete destruction of the infectious properties of the micro-organisms whilst retaining the antigenic properties of the micro-organisms. Furthermore, it is possible that certain infectious micro-organisms which are inactivated at the time of treatment with a particular inactivating agent for example formaldehyde, may recover their infectious properties and thus become disease causative agents either during storage or after administration to a patient as a vaccine. Moreover, it is also possible that particular inactivating agents for example formaldehyde or the action of ultra-violet light may cause the formation of aggregates of micro-organisms and such aggregates may retain untreated particles of infectious micro-organisms.

We have now found that the said disadvantages may be overcome by the use of a particular class of inactivating agent for example N-acetylethyleneimine in the production of immunising agents containing antigens for example vaccines and toxoids.

According to the invention therefore we provide a process for the preparation of immunising and diagnostic antigens which comprises the steps of subjecting a material selected from the group consisting of infectious micro-organisms and antigens thereof, to the action of a compound of the formula:

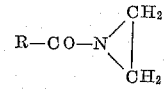

wherein R stands for a radical selected from the group consisting of methyl, ethyl, n-propyl and isopropyl radicals, removing from the material so treated any of the remaining unused compound and then preparing from the material a product containing immunusing and diagnostic antigens.

The N-acylethyleneimines with which this invention is concerned, and particularly N-acetyl-ethyleneimine, are suitable for the treatment of influenza, a virus vaccine, poliomyelitis vaccine, eastern equine encephalomyelitis vaccine, western equine encephalomyelitis vaccine, and foot-and-mouth disease virus vaccine. Diagnostic antigens which may also be treated by the N-acylethyleneimines in accordance with the present invention include eastern equine encephalomyelitis antigen, western equine encephalomyelitis antigen, and influenza A virus antigen.

The said infectious micro-organisms and antigens thereof used as starting material may be in the form of an aqueous suspension which may optionally contain protective agents for example a buffer for example a suitable quantity of sodium hydrogen phosphate to give an aqueous suspension of pH 8.0. The said infectious micro-organisms and antigens thereof used as starting material may also optionally be mixed with animal tissue for example guinea pig brain or mouse brain and cord.

As a particularly suitable compound of the formula stated above there may be mentioned for example N-acetylethyleneimine. The said compound is generally added to the infectious micro-organisms and antigens thereof, preferably in the form of an aqueous suspension, at a low temperature for example between about 0° C. and about 37° C. in order to obtain material containing a high yield of non-infectious, non-toxic antigenic material. It is to be understood however that higher temperatures of operation may be used although the material so obtained will contain the non-infectious, non-toxic antigenic material in reduced yield.

The period of time necessary to bring about inactivation with respect to infectivity of the infectious micro-organisms or with respect to toxicity of the antigens thereof, is dependent on several factors for example the nature of the particular micro-organism or antigen used, the concentration of the compound of the stated formula used, the initial concentration of the infectious micro-organism or antigen used, the concentration of any animal tissue which may be present and the temperature at which the process is carried out. It will be understood that a relatively high concentration of the infectious-micro-organism or antigen used or a relatively low concentration of the compound of the stated formula used or a relatively low temperature of operation used for inactivation will necessitate carrying out the operation for a longer period of time.

It is convenient to use a 20% w./v. suspension of a mixture of infectious micro-organisms and animal tissue in steril aqueous saline as starting material prior to centrifuge treatment. The compound of the stated formula for example N-acetylethyleneimine is generally used in the form of a solution in sterile distilled water and the concentration of the compound is preferably between the limits of about 0.005% v./v. and about 1% v./v. based upon the combined volume of the aqueous suspension f the micro-organism or antigen thereof and the solution of the compound. Under the foregoing conditions, the time required to bring about inactivation, with respect to infectivity of the infectious micro-organisms or with respect to toxicity of the antigens thereof, at a temperature of between about 18° C. to about 22° C. or 37° C., is generally of the order of from about one hour to about 24 hours.

The aqueous preparations so obtained containing immunising and diagnostic antigens may be rendered free from acute or chronic toxic properties by removal of any residual unused inactivating agents by means of a freeze-drying operation. Any suitable freeze-drying operation known to the art may be used for example the material containing immunising agents and antigens may first be frozen and then dried at a suitable low temperature and at a suitable low pressure for example between about 0.01 mm. and about 0.0001 mm. pressure during a period of several hours for example about 24 hours. There is thus obtained a dry preparation which is stable and can be stored under vacuum until required for use. Thus the aqueous preparations may be admixed with a sterile aqueous solution of sucrose preferably about 5% w./v. and the mixtures so obtained are freeze dried during about 24 hours and are then sealed under vacuum and stored until required for use, at a temperature of about 0–2° C. The dried preparations retain their antigenic properties during storage and are readily made available for use as a vaccine by the addition of sterile distilled water or saline.

It is to be understood however that a freeze-drying operation may not be attractive because of the cost involved in large scale manufacture and the aqueous preparations containing immunising and diagnostic antigens may be used as such after removal of any residual unused inactivating agent. Excess of inactivating agent for example acetylethyleneimine may be removed from the aqueous preparations containing immunising and diagnostic antigens by chemical means for example by hydrolysis or by adding a reagent which destroys acetylethyleneimine for example a salt containing thiosulphate anions for example sodium thiosulphate or a citric acid–sodium citrate buffer or a phosphate buffer or by a solvent extraction process.

Non-infective preparations of micro-organisms for example viruses, bacteria, and other organisms, which possess non-toxic antigenic properties, or contain other properties besides infectivity, can be prepared by using one of the stated compounds for example acetylethyleneimine. Such preparations, for example poliomyelitis virus or influenza virus treated with acetylethyleneimine may be used as a diagnostic agent for medical, veterinary or other purposes.

As stated above, the use of the compounds of the stated formula according to the process of the present invention provides consistent and reliable preparations of non-infectious and non-toxic material possessing antigenic properties for example immunising agents for example vaccines and the complete removal of infectious properties of the micro-organisms or of toxic properties of the antigens thereof is achieved with little or no loss of antigenic properties. The process of the present invention is particularly useful for the preparation of verterinary vaccines such as hog cholera (swine fever) virus vaccine and canine hepatitis virus vaccine.

The invention is illustrated but not limited by the following examples:

*Example 1*

Guinea pig brain infected with equine encephalomyelitis virus (New Jersey strain) is ground with sterile sand under sterile conditions and is then made into a 20% w./v. suspension by adding sterile 0.85% w./v. aqueous sodium chloride solution. The 20% w./v. suspension so obtained is centrifuged for 15 minutes at 4000 revolutions per minute and the supernatant liquid is carefully removed. The liquid so obtained is centrifuged for a further 5 minutes at 4000 revolutions per minute and the supernatant liquid is then carefully removed. This supernatant liquid is mixed with an equal volume of a 2% v./v. sterile solution of N-acetylethyleneimine in chilled distilled water and the mixture so obtained is kept at about 18–22° C. during 90 minutes with occasional gentle shaking.

A sample of the preparation thus obtained is inoculated intracerebrally into 12 mice (0.03 cc. per mouse) to test for the presence of live virus. No live virus is detected as shown by the survival of all mice in a healthy condition.

To the remainder of the preparation is added ¼ part by volume of 5% w./v. sterile aqueous sucrose solution and the mixture so obtained is then dispersed in 2 cc. portions into ampoules. The necks of the ampoules are reduced in size to a suitable capillary and the ampoules are then cooled using solid carbon dioxide as the refrigerant, during one hour, such that the vaccine preparation is frozen wedge-shaped in the ampoules. Each ampoule is then cooled in a refrigerant consisting of a mixture of solid carbon dioxide and β-methoxyethanol and, at the same time, the pressure within the ampoule is reduced by connection of the ampoule, to a high-vacuum rotatory pump with a displacement of 75 litres per minute and operating at a pressure of 0.001 mm. of mercury, through a condensing vessel at a temperature of between about —50° C. and about —100° C. After 24 hours, the ampoules are sealed under vacuum and then stored at a temperature of 2° C.

When required for use, each ampoule has its contents reconstituted by the addition of 2 cc. of sterile distilled water giving rapid dissolution and formation of a clear liquid. Samples of such liquid are tested for infectivity and toxicity by injecting 0.5 cc. intraperitoneally into each of 20 mice, on 3 separate occasions, (making a total of 1.5 cc. per mouse) with a period of 7 days between each injection. Infectivity and toxicity are found to be completely absent as indicated by the survival of all mice in very good health 4 months later.

A second batch of 20 mice is vaccinated and then challenged with live virus according to the following technique. Twenty newly weaned mice, of average weight 12–15 grams, are each injected with 0.5 cc. of the vaccine (reconstituted as described above) intraperitoneally on 3 separate occasions (making a total of 1.5 cc. per mouse) with a period of 7 days between each injection. Seven days after the last vaccination, the mice are inoculated intracerebrally with live virus, the amount of the dose being thirty times that dose which is lethal to 100% of mice when given intracerebrally. It is found that 40% of the mice survive this challenge with live virus. In a control experiment using unvaccinated mice, all mice are killed when challenged with live virus.

*Example 2*

The process as described in Example 1 is repeated using 0.5% v./v. of N-acetylethyleneimine, in place of 2% v./v. of N-acetylethyleneimine, and the mixture so obtained is kept at about 18–22° C. during 3 hours with occasional gentle shaking.

A sample of the preparation thus is inoculated intracerebrally into 12 mice (0.03 cc. per mouse) to test the presence of live virus. No live virus is detected as shown by the survival of all mice in a healthy condition.

To the remainder of the preparation is added ¼ part by volume of 5% v./v. sterile aqueous sucrose solution. The mixture so obtained is dispersed in 2 cc. portions into ampoules and freeze dried for 24 hours and then sealed under vacuum. The sealed ampoules containing dried vaccine preparation are then stood at 2° C.

When required for use, each ampoule has its contents reconstituted by the addition of 2 cc. of sterile distilled water giving rapid dissolution and formation of a clear liquid. Samples of such liquid are tested for infectivity and toxicity by injecting 0.5 cc. intraperitoneally into each of 20 mice, on 3 separate occasions (making a total of 1.5 cc. per mouse), with a period of 7 days between each injection. Infectivity and toxicity are found to be completely absent as indicated by the survival of all mice in very good health 4 months later.

A second batch of 20 mice is vaccinated and then challenged with live virus according to the following technique. Twenty newly weaned mice, of average weight 12–15 grams, are each injected with 0.5 cc. of the vaccine (reconstituted as described above) intraperitoneally on 3 separate occasions (making a total of 1.5 cc. per mouse) with a period of 7 days between each injection. Seven days after the last vaccination, the mice are inoculated intracerebrally with live virus, the amount of the dose being thirty times that dose which is lethal to 100% of mice when given intracerebrally. It is found that 50% of the mice survive this challenge with live virus. In a control experiment using unvaccinated mice, all mice are killed when challenged with live virus.

*Example 3*

The process as described in Example 1 is repeated using 0.25% v./v. of N-acetylethyleneimine, in place of 2% v./v. of N-acetylethyleneimine, and the mixture so obtained is kept at 37° C. during 3 hours with occasional gentle shaking.

The preparation so obtained contains no live virus as shown by inoculation of a sample of the preparation intracerebrally into mice.

To the remainder of the preparation is added ¼ part by volume of 5% w./v. sterile aqueous sucrose solution. The mixture so obtained is dispersed in 2 cc. portions into ampoules and freeze dried for 24 hours and then sealed under vacuum. The sealed ampoules containing dried vaccine preparation are then stood at 2° C.

When required for use, each ampoule has its contents reconstituted by the addition of 2 cc. of sterile distilled water giving rapid dissolution and formation of a clear liquid. Samples of such liquid are tested for infectivity and toxicity by injecting 0.5 cc. interperitoneally into each of 20 mice, on 3 separate occasions, (making a total of 1.5 cc. per mouse), with a period of 7 days between each injection. Infectivity and toxicity are found to be completely absent as indicated by the survival of all mice in very good health 4 months later.

A second batch of 20 mice is vaccinated and then challenged with live virus according to the following technique. Twenty newly weaned mice, of average weight 12–15 grams, are each injected with 0.5 cc. of the vaccine (reconstituted as described above) intraperitoneally on 3 separate occasions (making a total of 1.5 cc. per mouse) with a period of 7 days between each injection. Seven days after the last vaccination, the mice are inoculated intracerebrally with live virus, the amount of the dose being twenty times that dose which is lethal to 100% of mice when given intracerebrally. It is found that 74% of the mice survive this challenge with live virus. In a control experiment using unvaccinated mice, all mice are killed when challenged with live virus.

*Example 4*

The process as described in Example 1 is repeated using 0.1% v./v. of N-acetylethyleneimine, in place of 2% v./v. of N-acetylethyleneimine, and the mixture so obtained is kept at 37° C. during 4 hours with occasional gentle shaking. The preparation so obtained is freeze dried by the process described above and the dried product is then reconstituted with sterile distilled water to provide a vaccine. When this vaccine is inoculated into mice which are then challenged with live virus by the technique as described in Example 3, it is found that 100% of the mice survive this challenge with live virus. In a control experiment using unvaccinated mice, all mice are skilled when challenged with live virus.

*Example 5*

Mouse brain and cord infected with Lansing (mouse adapted) poliomyelitis virus is ground with sterile sand under sterile conditions and is then made into a 20% w./v. suspension by addition sterile 0.85% w./v. aqueous sodium chloride solution. The 20% w./v. suspension so obtained is centrifuged for 30 minutes at 4000 revolutions per minute and the supernatant liquid is carefully removed. The supernatant liquid so obtained is centrifuged for a further 5 minutes at 4000 revolutions per minute and the supernatant liquid is then carefully removed. This supernatant liquid is mixed with an equal volume of a 2% v./v. sterile solution of N-acetylethyleneimine, in chilled distilled water, and the mixture so obtained is kept at about 18–22° C. during 2 hours with occasional gentle shaking.

A sample of the preparation thus obtained is inoculated intracerebrally into 17 mice (0.3 cc. per mouse) to test for the presence of live virus. No live virus is detected as shown by the survival of all mice for 28 days in a healthy condition. A control group of 38 mice is inoculated intracerebrally with 10% w./v. suspension of Lansing (mouse adapted) poliomyelitis virus in sterile 0.85% w./v. aqueous sodium chloride solution (0.03 cc. per mouse) before treatment with acetylethyeneimine. These animals all become infected with live virus and they are all dead within 11 days after inoculation.

To the remainder of the preparation is added ¼ part by volume of 5% w./v. sterile aqueous sucrose solution. The mixture so obtained is dispersed in 2 cc. portions into ampoules and lyophilised for 24 hours and then sealed under vacuum. The sealed ampoules containing the dried vaccine preparation are then stored at 2° C.

When required for use, each ampoule has its contents reconstituted by the addition of 2 cc. of sterile distilled water giving rapid dissolution and formation of a clear liquid. Samples of such liquid are tested for infectivity and toxicity by injecting 0.5 cc. intraperitoneally into each of 20 mice, on 3 separate occasions (making a total of 1.5 cc. per mouse), with a period of 7 days between each injection. Infectivity and toxicity are found to be absent as indicated by the survival of all mice in very good health several months later.

*Example 6*

The process as described in Example 5 is repeated using 0.5% v./v. of N-acetylethyleneimine, in place of 2% v./v. of N-acetylethyleneimine, and the mixture so obtained is kept at about 18–22° C. during 6 hours with occasional gentle shaking.

The preparation so obtained contains no live virus and it may be dried by lyophilising according to the method described in Example 5. The dried material so obtained may be reconstituted by the addition of sterile distilled water. The clear liquid so obtained, when injected intraperitoneally into mice, is found to be free from infectivity and toxicity as indicated by the survival of all mice in very good health several months later.

*Example 7*

The process as described in Example 5 is repeated using 0.25% v./v. of N-acetylethyleneimine, in place of 2% v./v. of N-acetylethyleneimine, and the mixture so obtained is kept at about 37° C. during 4 hours with occasional gentle shaking.

The preparation so obtained contains no live virus and it may be dried by lyophilising according to the method described in Example 5. The dried material so obtained may be reconstituted by the addition of sterile distilled water. The clear liquid so obtained, when injected intraperitoneally into mice, is found to be free from infectivity and toxicity as indicated by the survival of all mice in very good health several months later.

*Example 8*

The process as described in Example 5 is repeated using 0.1% v./v. of N-acetylethyleneimine, in place of 2% v./v. of N-acetylethyleneimine, and the mixture so obtained is kept at 37° C. during 4 hours with occasional gentle shaking.

A sample of the preparation thus obtained is inoculated intracerebrally into 20 young mice (0.03 cc. per mouse) to test for the presence of live virus. No live virus is detected as shown by the survival of all mice for 40 days in a healthy condition. A control group of 38 mice is inoculated intracerebrally with 20% w./v. of Lansing (mouse adapted) poliomyelitis virus in sterile 0.85% w./v. aqueous sodium chloride solution (0.03 cc. per mouse) before treatment with acetylethyleneimine. These animals all become infected with live virus and they are all dead within 11 days after inoculation.

To the remainder of the preparation is added ¼ part by volume of 5% w./v. sterile aqueous sucrose solution. The mixture so obtained is dispensed in 2 cc. portions into ampoules and lyophilised for 24 hours and then sealed under vacuum. The sealed ampoules containing the dried vaccine preparation are then stored at 2° C.

When required for use, each ampoule has its contents reconstituted by the addition of 2 cc. of sterile distilled water giving rapid dissolution and formation of a clear liquid. Samples of such liquid are tested for infectivity, toxicity and power of immunisation by injecting 0.5 cc. intraperitoneally into each of 20 mice, on 4 separate occasions (making a total of 2 cc. per mouse) with a period of 10 days between each of the first three doses and 14 days between the third and the fourth dose. Fourteen days after the last injection the mice are in very good health thus showing an absence of infectivity and toxicity in the vaccine. These mice are then inoculated intracerebrally with live virus, the amount of the dose being thirty times that dose which is lethal to 100% of mice when given intracerebrally. It is found that 25% of the mice survive this challenge with live virus. In a control experiment using unvaccinated mice, all mice are killed when challenged with live virus.

*Example 9*

The process as described in Example 5 is repeated using 0.05% v./v. of N-acetylethyleneimine, in place of 2% v./v. of N-acetylethyleneimine, and the mixture so obtained is kept at 37° C. during 12 hours with occasional gentle shaking.

A sample of the preparation thus obtained is inoculated intracerebrally into 25 young mice (0.03 cc. per mouse) to test the presence of live virus. No live virus is detected as shown by the survival of all mice in a healthy condition at 35 days.

To the remainder of the preparation is added ¼ part by volume of 5% w./v. sterile aqueous sucrose solution. The mixture so obtained is dispensed in 2 cc. portions into ampoules and freeze dried for 24 hours and then sealed under vacuum. The sealed ampoules containing dried vaccine preparation are then stored at 2° C.

When required for use, each ampoule has its contents reconstituted by the addition of 2 cc. of sterile distilled water giving rapid dissolution and formation of a clear liquid.

Samples of such liquid are tested for infectivity, toxicity and power of immunisation by injecting 0.5 cc. intraperitoneally into each of 25 mice, on 4 separate occasions (making a total of 2 cc. per mouse) with a period of 10 days between each of the first three doses, and 14 days between the third and fourth dose.

Ten days after the last vaccination the mice are in very good health thus showing an absence of infectivity and toxicity in the vaccine. These mice are then inoculated intracerebrally with live virus, the amount of the dose being thirty times that dose which is lethal to 100% of mice when given intracerebrally. It is found that 44% of the mice survive this challenge with live virus. In a control experiment using unvaccinated mice none of the mice survives when receiving an intracerebral live virus challenge.

*Example 10*

The process as described in Example 5 is repeated using 0.025% v./v. of N-acetylethyleneimine in place of 2% v./v. of N-acetylethyleneimine and the mixture is kept at 37° C. during 12 hours with occasional gentle shaking.

A sample of the preparation thus obtained is inoculated intracerebrally into 20 young mice (0.03 cc. per mouse) to test the presence of live virus. No live virus is detected as shown by the survival of all mice in a healthy condition at 35 days.

To the remainder of the preparation is added ¼ part by volume of 5% w./v. sterile aqueous sucrose solution. The mixture so obtained is dispensed in 2 cc. portions into ampoules and freeze dried for 24 hours and then sealed under vacuum. The sealed ampoules containing dried vaccine preparation are then stored at 2° C.

When required for use, each ampoule has its contents reconstituted by the addition of 2 cc. of sterile distilled water giving rapid dissolution and formation of a clear liquid.

Samples of such liquid are tested for infectivity, toxicity and power of immunisation by injecting 0.5 cc. intraperitoneally into each of 20 mice on 3 separate occasions (making a total of 1.5 cc. per mouse) with a period of 7 days between first and second dose of vaccine and 14 days between second and third dose. Ten days after the last dose of vaccine all the mice are in very good health thus showing an absence of infectivity and toxicity in the vaccine. These mice are then inoculated intracerebrally with live virus, the amount of the dose being ten times that dose which is lethal to 100% of mice when given intracerebrally. It is found that 55% of the mice survive this challenge with live virus. In a control experiment using unvaccinated mice none of the mice survive when receiving an intracerebral live virus challenge.

*Example 11*

A fully grown culture of *Staphyloccus albus* originally isolated from human skin is centrifuged. The bacterial cells are suspended in sterile 0.85% w./v. aqueous sodium chloride solution, centrifuged and then re-suspended in further sterile 0.85% w./v. aqueous sodium chloride solution to give a cell suspension of optical density of 1.6 when a sample is examined in a 1 cm. spectrophotometer cell using light of wavelength 5,800 A. To 4 parts of the cell suspension so obtained, 1 part of a 1% v./v. solution of N-acetylethyleneimine, in chilled distilled water, is added and the resultant mixture is kept at 37° for 24 hours with occasional gentle shaking.

A sample of the preparation thus obtained is inoculated into bacterial nutrient broth and also on to an agar-agar bacterial nutrient medium in a culture dish. No live bacteria are detected as shown by the absence of bacterial growth in either case at 37° C. within 6 days.

To the remainder of the preparation is added ¼ part by volume of 5% w./v. aqueous sucrose solution. The mixture so obtained is dispensed in 2 cc. portions into ampoules and lyophilised for 18 hours and then sealed under vacuum. The sealed ampoules containing the dried vaccine preparation are then stored at 18–22° C.

When required for use, each ampoule has its contents reconstituted by the addition of 2 cc. of sterile distilled water giving rapid dissolution and formation of a smooth, even suspension. Samples of such material are tested for the presence of living bacteria by injection into bacterial nutrient broth which is then incubated at 37° for 6 days. The absence of viable bacteria is shown by the absence of bacterial growth under these conditions. The reconstituted vaccine is injected subcutaneously into rabbits. In no case do these show toxic symptoms resulting from injection of the vaccine. Two vaccination injections of 0.5 cc. per rabbit are given in the first week and two vaccination injections of 1.0 cc. per rabbit are given in the second week. Serum is then collected from these rabbits and from unvaccinated rabbits. The antibody titration of the serum is estimated by an agglutination reaction with a live suspension of the same bacteria. Considerable increase in agglutinating antibody is found in the vaccinated rabbit sera as compared with the unvaccinated rabbit sera.

*Example 12*

24 hours after infection with small amounts of influenza A virus, the chloro-allantoic membranes are harvested from 30 12th-day fertile hens eggs. The pooled membranes are three times alternately frozen at −70° C. and thawed at 37° C., and 30 cc. of M/100 phosphate-buffered saline are added. After mixing, the membranes are centrifuged at 3,000 revolutions per minute for 5 minutes and the supernatant membrane extract is removed. A sample of the extract is tested for its infectivity in fertile hens eggs, and 1 c.c. amounts of a $10^{-6.2}$ dilution infects 50% of eggs (i.e., the extract contains $10^{6.2}$ 50% egg infectivity doses ($EID_{50}$) per cc.). To a sample of this membrane extract is added acetylethyleneimine to give a final concentration of 1% v./v. of acetylethyleneimine and the mixture is incubated at 30° C. for 4 hours. At a dilution of 1:10, the treated extract infects no eggs out of 10 inoculated with 1 cc. The undiluted extract is toxic in eggs, but when the virus is separated by adsorption on to guinea pig red blood cells and is eluted into 0.85% sodium chloride solution, it is found to infect no eggs out of 10 inoculated with 1 cc. When the untreated and the acetylethyleneimine treated extracts are tested in parallel by the usual method (Salk pattern test) they are found to have the same capacities to agglutinate guinea pig red blood cells (the haemaglutinin titres are $10^{3.0}$ and $10^{2.95}$ haemaglutinin units per cc., respectively, which are not significantly different with the technique employed). When testing against the same sample of human convalescent serum, which contains antibodies to the soluable antigen of influenza type A, the untreated and the acetylethyleneimine treated extracts are again found to contain indistinguishable amounts of soluble antigen, as measured by complement fixation ($10^{3.05}$ and $10^{3.2}$ soluble antigen units per cc. respectively).

In diagnosis of influenzal infection in man, serum antibodies are measured in terms of their combining power with the haemaglutinin or with the soluble antigen of the influenza virus. The non-infective acetylethyleneimine treated influenza virus preparations obtained as described above may thus be used for this purpose.

The immunising and diagnostic antigens obtained according to the process of the present invention are more effective and more reliable than those obtained according to the prior art, by the use of formaldehyde or β-propiolactone, as will be seen from the following experiment.

Acetylethyleneimine is compared with formaldehyde and β-propiolactone as an inactivating agent for the virus of equine encephalomyelitis using mice as the experimental animals. The purpose of this experiment is to obtain evidence regarding the relative merits of acetylethyleneimine, formaldehyde and β-propiolactone as inactivating agents in the preparation of viral vaccines, by measuring the antibodies formed in the sera of vaccinated animals. Mice received intraperitoneally 0.5 ml. of one of the following preparations on day 1, day 15 and day 30 of the experiment (3 doses in all):

(a) 20% equine encephalomyelitis virus inactivated by an equal volume of 1:1250 formaldehyde for 30 hours at 37° C.

(b) 20% equine encephalomyelitis virus inactivated by an equal volume of 0.2% β-propiolactone for 2 hours at 37° C.

(c) 20% equine encephalomyelitis virus inactivated by an equal volume of 0.05% acetylethyleneimine for 12 hours at 37° C.

(d) physiological saline solution.

The animals are bled for serum on day 15, day 29 and day 43 of the experiment after one, two and three injections respectively. The infective properties of the vaccines are completely inactivated while their antigenic properties are retained as judged by intracerebral injection of adequate numbers (15-30) of mice. Antibody in the serum of vaccinated animals is measured by serum-neutralisation tests. Equal quantities of serum and various dilutions of virus are mixed and allowed to stand for one hour at 18–22° C. before intramuscular injection into mice. Where complete neutralisation of the strongest suspension of virus (10%) is obtained, the serum is diluted and retested. The results obtained with the pooled sera from immunised mice appear in the following table:

| Vaccinated animals received | Serum mixed with | 1 Dose of vaccine | 2 Doses of vaccine | 3 Doses of vaccine |
|---|---|---|---|---|
| Saline | $10^{-3}$ virus | 4 4 5 5 5 5 | 4 4 5 5 5 5 | 3 4 4 4 4 4 |
|  | $10^{-4}$ virus | 4 5 5 5 5 S | 4 4 4 5 5 6 | 3 4 4 5 6 S |
|  | $10^{-5}$ virus | 4 5 5 S S S | 4 4 4 4 5 6 | 5 5 5 6 S S |
| Formalin vaccine | $10^{-1}$ virus | 4 5 7 7 9 S | 4 5 6 7 8 S | 5 5 5 6 S S |
|  | $10^{-2}$ virus | 7 7 8 S S S | 5 6 7 9 S S | 5 5 5 6 S S |
|  | $10^{-3}$ virus | 5 5 6 S S S | S S S S S S | S S S S S S |
|  | $10^{-4}$ virus | 7 S S S S S | S S S S S S | S S S S S S |
| BPL vaccine | $10^{-1}$ virus | 7 8 8 8 S S | 5 6 6 7 7 9 | 4 6 6 6 10 S |
|  | $10^{-2}$ virus | 6 6 S S S S | 5 7 7 7 9 S | 5 S S S S S |
|  | $10^{-3}$ virus | S S S S S S | S S S S S S | S S S S S S |
| AEI vaccine | $10^{-1}$ virus, 1:8 serum |  |  | 5 5 6 S S S |
|  | $10^{-1}$ virus, 1:4 serum |  |  | 6 S S S S S |
|  | $10^{-1}$ virus, 1:2 serum |  |  | S S S S S S |
|  | $10^{-1}$ virus | 5 7 8 S S S | 6 7 7 8 S S | S S S S S S |
|  | $10^{-2}$ virus | 8 8 9 S S S | 6 S S S S S | S S S S S S |
|  | $10^{-3}$ virus | 7 S S S S S | S S S S S S | S S S S S S |

NOTE.—The numerals indicate the days on which mice succumbed to E.E.M.
S=survival.

These results show clearly that the serum of animals receiving three doses of acetylethyleneimine vaccine contain appreciably more antibody than that from animals receiving formaldehyde or β-propiolactone vaccine.

What we claim is:

1. Process for the preparation of a virus vaccine containing antigens, which comprises treating equine encephalomyelitis virus with N-acetylethyleneimine for a time sufficient to inactivate infectious properties of said equine encephalomyelitis virus while retaining the antigenicity thereof and then removing from the virus so treated any unused N-acetylethyleneimine.

2. Process for the preparation of a virus vaccine containing antigens, which comprises treating poliomyelitis virus with N-acetylethyleneimine for a time sufficient to inactivate infectious properties of the said poliomyelitis virus while retaining the antigenicity thereof and then removing from the virus so treated any unused N-acetylethyleneimine.

3. Process for the preparation of a diagnostic antigen, which comprises treating influenza A virus with N-acetylethyleneimine for a time sufficient to inactivate infectious properties of said influenza virus while retaining the antigenicity thereof and then removing from the virus so treated any unused N-acetylethyleneimine.

References Cited by the Examiner

Brown et al.: The Journal of Immunology, vol. 82, No. 5, May 1959, pp. 444–447.

Cooper: Nature, vol. 190, pp. 302–305, Apr. 22, 1961.

LEWIS GOTTS, *Primary Examiner.*

JULIAN S. LEVITT, *Examiner.*

RICHARD HUFF, *Assistant Examiner.*